(12) United States Patent
Roettgermann et al.

(10) Patent No.: US 9,088,433 B2
(45) Date of Patent: Jul. 21, 2015

(54) DEVICE AND METHOD FOR RECORDING PROTOCOL EVENTS IN AN ADVANCED COMMUNICATION SYSTEM

(75) Inventors: Clemens Roettgermann, Munich (DE); Dirk Moeller, Zorneding (DE); Mathias Rausch, Markt Schwaben (DE)

(73) Assignee: Freescale Semiconductor, Inc., Austin, TX (US)

( * ) Notice: Subject to any disclaimer, the term of this patent is extended or adjusted under 35 U.S.C. 154(b) by 190 days.

(21) Appl. No.: 13/508,279

(22) PCT Filed: Nov. 10, 2009

(86) PCT No.: PCT/IB2009/054978
§ 371 (c)(1),
(2), (4) Date: May 4, 2012

(87) PCT Pub. No.: WO2011/058389
PCT Pub. Date: May 19, 2011

(65) Prior Publication Data
US 2012/0233500 A1 Sep. 13, 2012

(51) Int. Cl.
*G06F 11/273* (2006.01)
*H04L 12/40* (2006.01)
(Continued)

(52) U.S. Cl.
CPC ...... *H04L 12/40006* (2013.01); *G06F 11/3027* (2013.01); *G06F 11/3636* (2013.01);
(Continued)

(58) Field of Classification Search
CPC ............ G06F 11/3013; G06F 11/3027; G06F 11/3051; H04L 2012/40241; H04L 12/40169; H04L 69/22; H04L 69/40

USPC .......................................... 714/18, 27, 30, 39
See application file for complete search history.

(56) References Cited

U.S. PATENT DOCUMENTS 6,075,941 A * 6/2000 Itoh et al. ....................... 717/128
6,311,303 B1 * 10/2001 Gates et al. ................... 714/734
(Continued)

FOREIGN PATENT DOCUMENTS

JP 2009027358 A 2/2009
JP 2009253803 A 10/2009
(Continued)

OTHER PUBLICATIONS

An Expansion Board for FlexRay Communications, OP-SSB8 by LineEye Apr. 14, 2009 http://www.lineeye.com/html/g_090414_OP-SB88.html.*
(Continued)

*Primary Examiner* — Joseph Schell

(57) ABSTRACT

An advanced communication controller unit for a distributed communication system having a plurality of communication controller units, at least one being an advanced communication controller unit, each coupled to a communication medium and adapted to communicate using a communication is presented. The advanced communication controller unit comprises a protocol event recording circuit having a monitoring input connected to at least one protocol event data transmission path of the advanced communication controller unit and a debug output connected to a memory device; and adapted to filter protocol event data received from the monitoring input depending on at least one configuration parameter and to provide filtered protocol event data to the debug output. A method for recording protocol events using a protocol event recording circuit in an advanced communication controller unit and a vehicle comprising at least one advanced communication controller unit are also disclosed.

20 Claims, 5 Drawing Sheets

(51) Int. Cl.
*G06F 11/30* (2006.01)
*G06F 11/36* (2006.01)
*H04L 12/24* (2006.01)

(52) U.S. Cl.
CPC ... *H04L41/0604* (2013.01); *H04L 2012/40215* (2013.01); *H04L 2012/40241* (2013.01); *H04L 2012/40273* (2013.01)

(56) References Cited

U.S. PATENT DOCUMENTS

| | | | |
|---|---|---|---|
| 6,618,775 | B1 | 9/2003 | Davis |
| 6,854,029 | B2 | 2/2005 | Davis |
| 6,912,673 | B1* | 6/2005 | Wyland ............ 714/43 |
| 7,149,926 | B2 | 12/2006 | Ahmad et al. |
| 7,869,906 | B2 | 1/2011 | Louch et al. |
| 8,179,795 | B2 | 5/2012 | Kimura et al. |
| 8,432,814 | B2* | 4/2013 | Fuhrmann et al. ............ 370/242 |
| 2004/0081079 | A1* | 4/2004 | Forest et al. ............ 370/216 |
| 2006/0050735 | A1* | 3/2006 | Isaac et al. ............ 370/469 |
| 2006/0067264 | A1* | 3/2006 | Whaley ............ 370/321 |
| 2007/0140294 | A1 | 6/2007 | Takatori et al. |
| 2007/0174684 | A1* | 7/2007 | Englert et al. ............ 714/12 |
| 2008/0115115 | A1 | 5/2008 | Codrescu et al. |
| 2009/0106606 | A1* | 4/2009 | Duan et al. ............ 714/48 |
| 2009/0125592 | A1* | 5/2009 | Hartwich et al. ............ 709/206 |

FOREIGN PATENT DOCUMENTS

| | | |
|---|---|---|
| WO | 2008-110957 A2 | 9/2008 |
| WO | 2008120634 A1 | 10/2009 |

OTHER PUBLICATIONS

FlexRay Automotive Communication Bus Overview by National Instruments Aug. 21, 2009 http://www.ni.com/white-paper/3352/en/.*

Introduction to TTP and FlexRay Protocols by Finn Hansen Nov. 15, 2005 http://staff.iha.dk/foh/Foredrag/TTPFlexRay-IDAForedrag.pdf.*

Whitepaper by NXP: "Trends in Debug Features for Microcontrollers" Web page: http://www.elektroniknet.de/whitepaper/?tx_wekawhitepaper_pi1%5Bview%5D=whitepaper&tx_wekawhitepaper_pi1%5Buid%5D=88 Jun. 29, 2009, pp. 1-3.

International Search Report correlating to PCT/IB2009/054978 dated Aug. 5, 2010.

LINEEYE CO., LTD., "The Communication Test Mainboard OP-3B88 for Supporting the LEXEL Vehicle-Mounted Communication Specification FlexRay", http://www.lineeye.com.cn/html/news090319_OP-SB88.html, Mar. 19, 2009, 1 page. Cited in Foreign search report.

International Search Report and Written Opinion mailed Aug. 5, 2010 for International Application No. PCT/IB2009/054978, 9 pages.

* cited by examiner

DEVICE AND METHOD FOR RECORDING PROTOCOL EVENTS IN AN ADVANCED COMMUNICATION SYSTEM

FIELD OF THE INVENTION

This invention in general relates to communication systems and in particular to an advanced communication controller unit, a method for recording protocol events, and a vehicle.

BACKGROUND OF THE INVENTION

A data communication system usually consists of several communicating nodes connected to a communication medium such as a data bus, exchanging message data across the communication medium. Each communicating node typically contains a communication controller configured to listen to signals on the bus, receive data from the bus and send data across the bus to other nodes. In order to allow for meaningful signal exchange, data transmission is performed according to a communication protocol, which may consist of a stack of different protocols defining rules for different layers of communication such as the physical access to the communication medium or the transport of data between nodes.

A node may for example contain a processing device such as a microcontroller. In an automotive environment for example, a processing device may be an electronic control unit, that is any embedded system that controls one or more of the electrical systems or subsystems in a motor vehicle. Nodes may communicate using a communication protocol. For automotive applications, the Controller Area Network (CAN) protocol or the FlexRay protocol may be used, just to give some examples. The CAN bus is a vehicle bus standard designed to allow microcontrollers and devices to communicate with each other within a vehicle. FlexRay provides an alternative solution being faster and more reliable. The FlexRay communication protocol is based on a time division multiple access (TDMA) scheme for accessing the communication medium by several devices, which requires synchronization between nodes to be established during a start phase of the communication system.

Referring to FIG. 1, a schematic example of a first message sequence chart 10, having a vertical time axis, of a failing startup sequence of a prior art communication controller unit 14 is shown. The startup phase may be a period of high event rates. In the shown example, a software module 12 triggers a startup of a FlexRay controller 14 setting up communication with other FlexRay controllers 16 in a communications system. The controller 14 receives configuration data 18 and subsequent run startup command 20 from the software module 12. The controller starts to set up communication 22 with the controllers 16 of the other communicating nodes. After a certain time, startup communication 14 fails and the controller 14 indicates the failure to the software module 12. In the shown example, the FlexRay controller 14 may issue a message 24 to the software module 12, which is an indication that the communication could not be established and that the protocol state machine failed to enter its normal activity state. However, after receiving the failure message 24, no reason for the malfunction may be derived 26 by the software module.

In case of a malfunction of the communication system detected at a communication controller of the system, debugging of the system as a methodical process of finding and removing or at least reducing the number of defects may be applied. For this, trace information containing for example relevant protocol events such as register content changes for rate and offset correction values, state changes of a state machine implementing the protocol execution, or slot status information, just to name a few, may be analysed.

With single-step debugging, these information can be acquired by inserting breakpoints into the operation of the protocol to cause an interruption of protocol execution and read out status information from the controller for further analysis. However, during time of interruption, controllers of other nodes may continue processing and communicating, therefore changing their states and the state of the communication bus.

Or for example status information of controller state registers may be traced during execution of the communication protocol, avoiding interruption of protocol execution. The process of accessing and reading the relevant information to be traced for example from status registers consumes a portion of system resources such as bandwidth of an internal data bus and requires additional processor load. This intrusive approach may change or disturb the time flow of protocol execution, which may be relevant for example when real time execution is desired. During periods of high event rates on the communication medium, such as the startup phase of the system, only a part of the events may be traced in order to reduce influence on the schedule of the protocol flow.

In WO2008/110957 A2 a monitoring device coupled to a FlexRay communication system is described which intrusively checks the communication controller for protocol conform behavior of the controller. The shown bus guardian implements own counters and timers for observing the correct behavior of the communication controller. It implements separate reference state machines in order to compare the transitions of the communication controller state machine against its reference.

In U.S. Pat. No. 6,854,029 B2 a DSP bus monitoring apparatus is described. An embedded processor as a monitoring device for an internal bus of a system, which is not a distributed communication system, is provided as a testing tool. The bus monitor resides within the same chip or module as a digital signal processor (DSP), which allows connection to internal processor buses not accessible from external contacts. The monitor uses a separate circular buffer to continuously store data traces from each of one or more internal processor buses. Upon the occurrence of a trigger condition, storage stops and a trace is preserved for evaluation of processor operation.

In U.S. Pat. No. 7,149,926 B2 a configurable trace port for embedded processors is described. A trace port is provided which selectively limits the amount of trace information passed from a processor core to an output buffer. The processor trace data can be compressed to meet an adjustable read-out rate of the output buffer.

In US 2008/0115115 A1 an embedded trace macrocell for DSP debugging operations is shown. The macrocell records selectable aspects of a non-intrusively monitored software execution and generates breakpoints.

SUMMARY OF THE INVENTION

The present invention provides an advanced communication controller unit, a method for recording protocol events, and a vehicle as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
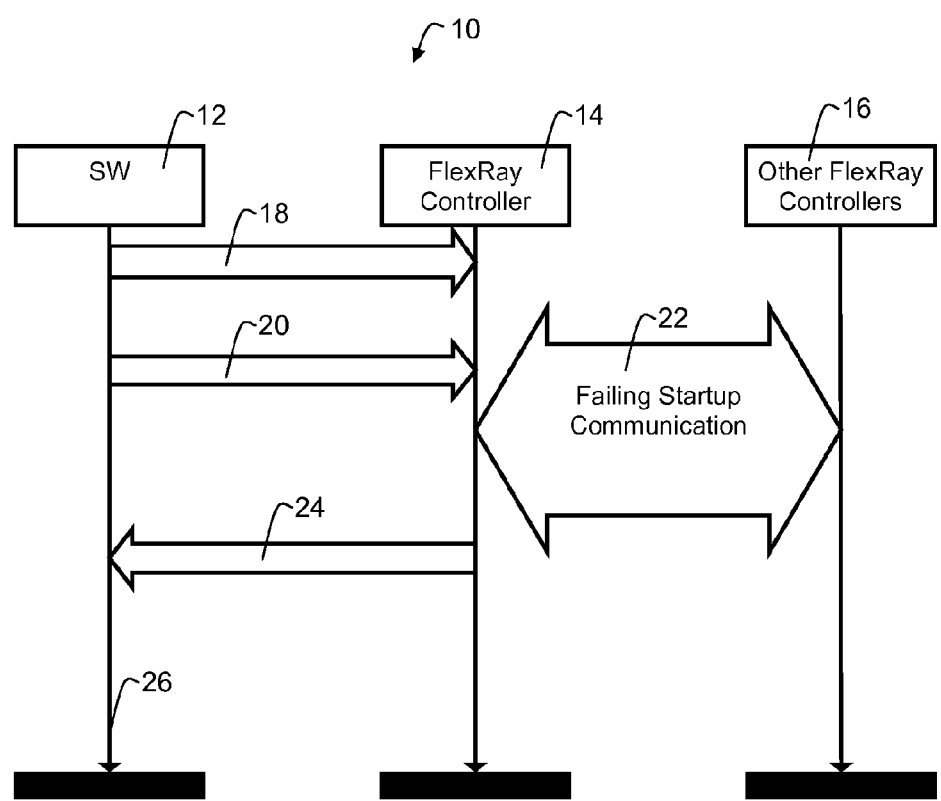
FIG. 1 schematically shows an example of a first message sequence chart of a failing startup sequence of a prior art communication controller unit.
Figure 2:
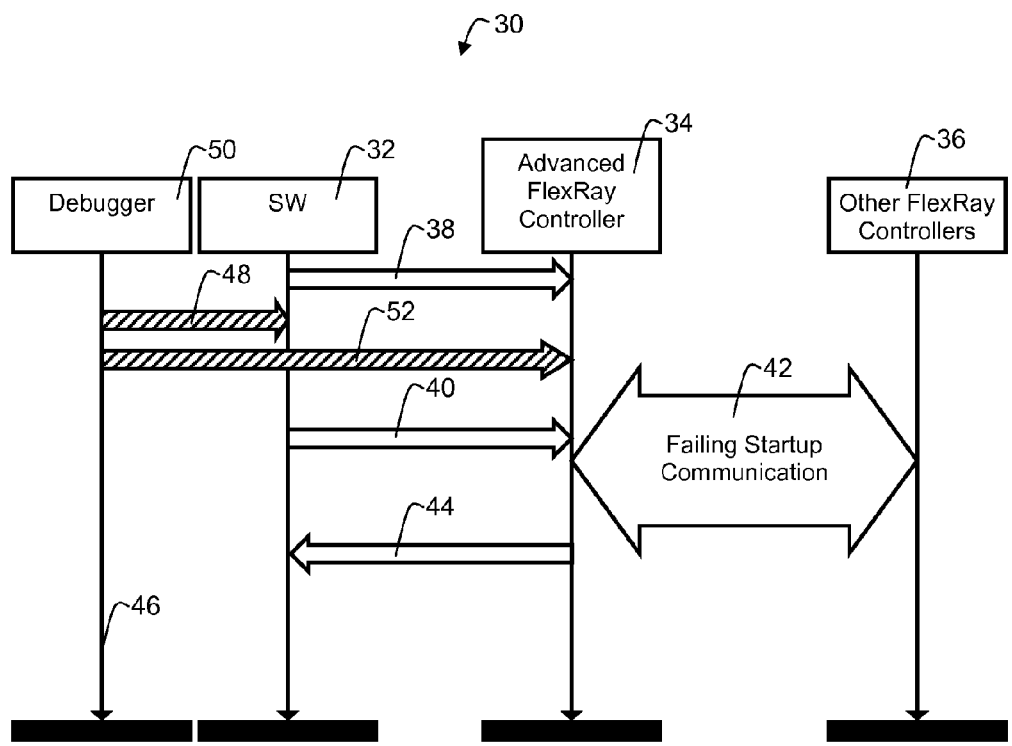
FIG. 2 schematically shows an example of a second message sequence chart of a failing startup sequence of an example embodiment of an advanced communication controller unit.

Referring to FIG. 2, a schematic example of a second message sequence chart 30, having a vertical time axis, of a failing startup sequence is shown, now for an example embodiment of an advanced communication controller unit 34. Similar to FIG. 1, the startup phase may be a period of high event rates and the shown example may refer to a FlexRay communication system. In the shown example, a software module 32 triggers a startup of an advanced FlexRay controller 34 setting up communication with other FlexRay controllers 36 in a communications system. The other FlexRay controllers 36 may either be prior art or advanced communication controllers. The advanced FlexRay controller unit 34 receives configuration data 38. Then operation of the software module 32 is halted on reception of a break message 52 issued for example by a debugging module 50. However, module 50 may be any other entity adapted to configure the advanced functionality of the advanced FlexRay controller 34. The debugging module 50 may then send a protocol event recording circuit configuration message 52 to the shown advanced communication controller 34. The message may contain at least one configuration parameter. Or the message may cause the advanced communication controller unit 34 to read protocol event recording circuit configuration data for example from a configuration file or a debugger window or may trigger execution of a changed configuration routine. A subsequent run startup command 40 from the software module 32 may then cause the advanced communication controller unit 34 to continue normal operation. The advanced communication controller 34 starts to set up communication 42 with the controllers 36 of the other communicating nodes. After a certain time, startup communication 44 fails and the controller 34 indicates the failure to the software module 32. In the shown example, the FlexRay controller 34 may issue a message 44 to the software module 12 which is an indication that the communication could not be established and that the protocol state machine failed to enter its normal activity state. After receiving the failure message 44, a reason for the malfunction may be derived 46 by the debugging module 50 by reading and evaluating a memory device containing selected traced protocol event data extracted from protocol event data encountered at the advanced memory device and stored in the memory device by the protocol event recording circuit.

Figure 3:
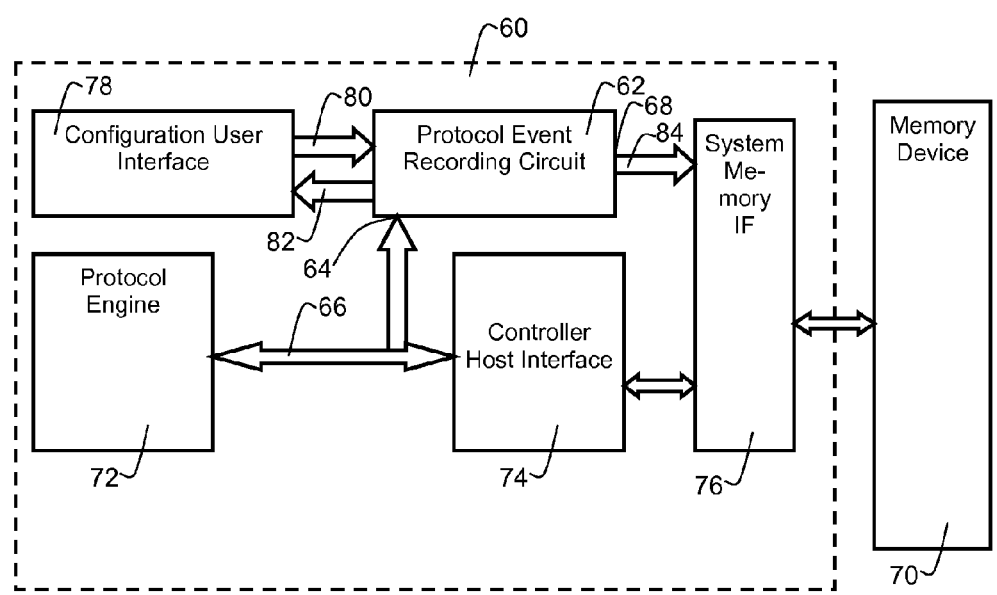
FIG. 3 shows a schematic block diagram of an example of an embodiment of an advanced communication controller unit.

Referring now to FIG. 3, a schematic block diagram of an example of an embodiment of an advanced communication controller unit 60 is shown. As an example, the illustrated advanced communication controller unit 60 may be based on a FlexRay communication controller. The shown controller may be an advanced communication controller unit 60 for a distributed communication system having a plurality of communication controller units, at least one being an advanced communication controller unit 60, each coupled to a communication medium and adapted to communicate using a communication protocol. The advanced communication controller unit 60 may comprise a protocol event recording circuit 62 having a monitoring input 64 connected to at least one protocol event data transmission path 66 of the advanced communication controller unit 60 and a debug output 68 connected to a memory device 70; and may be adapted to filter protocol event data received from the monitoring input 64 depending on at least one configuration parameter and to provide filtered protocol event data to the debug output 68.

The shown advanced communication controller 60 may provide a means for debugging protocol events wherein the functionality may be implemented with no or only minimum impact on software applications using a communicating node comprising the advanced communication controller unit.

The protocol event recording circuit 62 may be adapted to store protocol event data in the memory device 70. This traced data may subsequently be read for debugging of the controller and the communications system. The event observer module, that is the protocol event recording circuit 62 may be configured depending on the at least one configuration parameter which may for example be used to select which protocol events to store and when.

The protocol event recording circuit may be implemented using only a minimum of logic circuitry for filtering protocol event data and selecting data considered relevant depending on the at least one configuration parameter. This may allow for implementation based on a prior art communication controller unit with only a minimum increase of power consumption and required die area.

As shown, the advanced communication controller unit 60 may comprise a protocol engine unit 72. It may consist of several communication components such as for example a media access control (MAC) component for bus access, for example via one or more transceiver units, and a protocol engine control (POC) component implementing a state machine for protocol execution. For example, a FlexRay POC may comprise eight different states depending on the progress of communication wherein each controller state is characterized by certain communication-specific activities. The POC component of a FlexRay controller is responsible for controller state transitions.

And the shown advanced communication controller unit 60 may comprise a host interface 74 for communication with a host processor (not shown), such as a microcontroller, executing an application which generates data to be transmitted and consumes data received from the communication network. A communication node may comprise a controller unit and a host processor. As an example, a FlexRay controller relieves the host of communication tasks. For a FlexRay controller the host interface 74 may be a Controller Host Interface (CHI).

The host interface 74 may be connected to the protocol engine unit 72 for transmission of data, for example protocol event data. Hence, there may be a direct or indirect protocol event data transmission path 66 available between the protocol engine and the host interface 74.

Internal register buffers of the host interface 74 may be considered as being part of the protocol event transmission path 66 and a monitoring input 64 for example being connected to directly monitor status information of host interface registers may be in the scope of a monitoring input 64 connected to at least one protocol event data transmission path 66. In the shown embodiment of the advanced communication controller unit 60, the protocol event transmission path 66 is an internal path between the protocol engine 72 and the host interface 74. It should be noted that in other embodiments the path 66 may connect different controller modules, for example the protocol engine 72 and an interface to an external transceiver. This may require additional circuitry within the protocol event recording circuit for extraction of protocol events.

Transmitting data may comprise sending data and receiving data and may therefore refer to bi-directional as well as to uni-directional communication.

A protocol event may be any important information related to the protocol being executed.

As an example, a FlexRay observer module as a protocol event recording circuit may be sensitive to FlexRay protocol events for example detected by observing changes of existing but volatile information in the CHI. FlexRay protocol events may for example comprise POC state changes, POC sub-state changes, events like "integration started on channel A/B", "potential frame start A/B", "integration aborted A/B", "valid sync frame on A/B", wherein A and B refer to data transmission channels implemented by the method of multiple access to the communication medium, information of the utility bus, slot status information of specified slots or rate and offset correction values and the conditions for loosing the state of normal activity POC:NormalActive. The events can be recorded for a specific time instant or during specific cycles or continuously, for example started and stopped by a debugger module.

The communication medium may be any wired or wireless communication medium allowing for signal transmission, for example using electrical pulses, electro-magnetic or optical waves.

The host interface 74 may access a system memory through a system memory interface 76.

The communication protocol may be any communication protocol. It may for example be a real time communication protocol, that is a communication protocol wherein communication is subject to real-time constraints, i.e. operational deadlines for information delivery and from event to system response. A real-time deadline must be met, regardless of system load. The shown advanced communication controller unit may allow for recording trace data without influencing or changing the flow of protocol execution and schedule. This may be important for example for safety critical systems, for example in an automotive environment.

And the communication protocol may be a time-triggered communication protocol. Communication controller units, although distributed across the communication system, may use a common timing. Here, clock synchronization may be used to provide all nodes with an equivalent time concept. Each node measures the difference between an a priori known expected and the observed arrival time of a correct message to detect a difference between the clock at the sender and the clock at the receiver. A fault-tolerant average algorithm may then calculate a correction term for the local clock so that the clock is kept in synchrony with all other clocks of the communication system. This may be used for time division multiple access to the communication medium, wherein communication controllers are sequentially allowed to transmit for a predetermined time duration. The provided advanced communication controller unit may allow to record protocol event data for debugging without impact on synchronization of communicating nodes of the communication system.

The communication protocol may be any communication protocol used for buses in non-automotive environment such as for example Ethernet or Universal Serial Bus (USB) protocol, or in an automotive environment such as for example Controller Area Network (CAN), Local Interconnect Network (LIN), Media Oriented Systems Transport (MOST), Time-Triggered Protocol (TTP), Serial Communication Interface (SCI), or byte-flight protocols.

And in an embodiment of the advanced communication controller unit, the communication protocol may comprise the FlexRay (trademark) protocol. The communication protocol may either be conform to the FlexRay standard or may comprise additional non-standardized functionality. The FlexRay protocol allows for high data transmission rates and reliable transmission using a synchronized access to the communication medium. Therefore, the presented advanced communication controller unit 62 may allow for acquiring trace data with little or no impact on the course of communication.

The protocol event recording circuit may be adapted to non-intrusively record the filtered protocol event data. No breakpoints may be inserted to halt the system for extraction of trace data and essentially no or only very few delay may be introduced due to the operation of the protocol event recording circuit.

This may be important during communication periods where a high event rate can be expected, for example during initial setting up of communication between communication controllers of a system, for example during establishing of clock synchronization. The protocol event recording circuit may be adapted to record the protocol event data during a startup phase of the communication system. Protocol events such as FlexRay protocol events during startup often take place faster than the information can be observed in existing debugging environment. The advanced communication controller unit may be able to record trace data even during a period of high event rates such as the startup period.

This may for example help avoid a debugging method wherein state register reads are triggered based on interrupts and the same start-up phase is run several times, with one state print at a different occurrence of the state change interrupt.

And the memory device 70 may be a first in, first out (FIFO) buffer device. This may allow to continuously trace protocol event data.

And the memory device 70 may be a generic buffering sub-system, such as a sub-system of system memory or an external bus interface. This may avoid additional separate memory hardware or additional die area for a dedicated protocol event recording memory within the advanced communication controller unit 62 and may allow usage of advanced bus debugging, for example using the NEXUS debugging interface to directly debug the protocol events at the system memory bus in real-time, with real-time stamp information. The debug output 68 of the protocol event recording unit 62 may be connected to the memory device 70 via a common system memory interface 76, avoiding implementation of additional interface circuitry. The system memory interface 76 may for example be the same as used for writing and reading message buffer content into and from the system memory.

The shown advanced communication controller may provide a means for debugging protocol events such as FlexRay protocol events without side effects on existing software and schedule, by adding the protocol event recording circuit 62 which may record critical FlexRay events into the memory device 70, which may for example be a FIFO. The memory device may be located in the system memory outside of the communication controller unit on the microcontroller and may be easily observed by a debugger after the problem to be debugged occurred. The size of the memory device may be configurable depending on a parameter. The size may be all or a portion of the system memory. An indictor may be provided to inform the host processor about availability of recorded data.

The advanced communication controller unit 60 may comprise a configuration user interface 78 adapted to provide the at least one configuration parameter to the protocol event recording circuit 62. The protocol event recording circuit 62 may comprise a configuration input for receiving a configuration message 80 either containing the configuration parameter or triggering reading of configuration parameters from a different source as described with FIG. 2. The configuration user interface may receive a write address or a write pointer 82. A configuration user interface 78 may for example be part of an already existing communication controller user interface. It may provide an interface for a software tool to set configuration parameters. In another embodiment it may be an interface for hardware setting of configuration parameters, for example using any kind of switches.

A configuration user interface module 78 may store the configuration information for the protocol event recording circuit and may provide the write pointer 82 identifying the location of the recorded data to an application or debugger. The configuration parameters may contain a buffer size of the memory device 70 and a specification which protocol events to be recorded and when they are recorded. The memory device 70 may be adapted to buffer an amount of the filtered protocol event data depending on a configurable buffer size parameter. The chosen buffer size may depend for example on the communication protocol and associated maximum data rate, an expected or maximum protocol event rate or other parameters.

The protocol event recording circuit 62 may be adapted to provide the filtered protocol event data to the memory device 70 in a protocol event frame format. This format may refer to a small data structure and may be defined for example depending on the type of events to be recorded or the data format of the used protocol. The protocol event recording circuit 62 may provide frames 84 to the system memory interface 76. The protocol event frame format may comprise timing information. For example, time stamps in units of the CHI host clock, PE μT or FlexRay [cycle,macrotick] timing may be added to a FlexRay protocol event frame. This may allow for example advanced system bus debuggers like NEXUS to be used to capture the FlexRay protocol event frames with real-time time stamps. Based on the recording configuration as provided by the configuration user interface 78, the protocol event recording circuit 62 may be sensitive to a certain set of protocol events. On each occurrence of such an event, the recording circuit 62 may be adapted to compose one frame such as a FlexRay protocol event frame and may push it to the memory device 70, which may be a FIFO, for example by means of the system memory interface 76. Each push may increment the write pointer 82.

Figure 4:
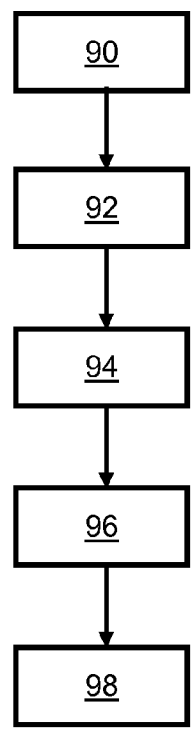
FIG. 4 schematically shows a diagram of an example of an embodiment of a method for recording protocol events.

Referring now to FIG. 4, a schematic diagram of an example of an embodiment of a method for recording protocol events is shown. The illustrated method allows implementing the advantages and characteristics of the described advanced communication controller unit as part of a method for recording protocol events using a protocol event recording circuit in an advanced communication controller unit.

The shown method for recording protocol events using a protocol event recording circuit in an advanced communication controller unit for a distributed communication system having a plurality of communication controller units, at least one being an advanced communication controller unit, each coupled to a communication medium and adapted to communicate using a communication protocol, may comprise receiving 90 protocol event data transmitted on at least one protocol event data transmission path of the advanced communication controller unit; filtering 92 the protocol event data depending on at least one configuration parameter; and providing 94 filtered protocol event data to a memory device.

And in an embodiment of the method, the method may comprise providing 96 the at least one configuration parameter to the protocol event recording circuit using a configuration user interface.

And in an embodiment of the method, the method may comprise processing 98 the filtered protocol event data using a debugging unit.

Figure 5:
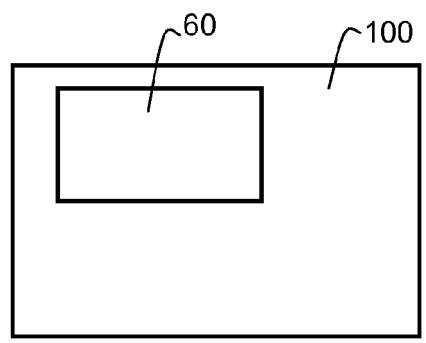
FIG. 5 schematically shows an example of an embodiment of a vehicle comprising an advanced communication controller unit.

Referring now to FIG. 5, an example of an embodiment of a vehicle comprising an advanced communication controller unit is shown. A vehicle may comprise at least one advanced communication controller unit as described above. A vehicle may be a car. However, it may be any automotive apparatus, such as a plane, a ship, a helicopter etc. Automotive communication systems such as for example the FlexRay communication system may provide a reliable communication, which may for example be important for safety critical systems. A safety-critical system may be a system used in an environment where safety and avoidance of system failure is a critical issue and may be found in functional safety applications, such as vehicle safety systems, for example brake or electrical steering system, where a malfunction could induce a dangerous situation for the driver and accurate trace data for erroneous behavior discovered during development and testing of the system may help avoid later system malfunctioning.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the advanced communication controller unit 60 may be a single device. However it may be composed of more devices. For example, the protocol event recording circuit 62 may be implemented separately and connected to the remaining modules of the controller unit 60 by means of interfaces.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the advanced communication controller unit 60 may be integrated with a host processor. Alternatively, the example may be implemented as any number of separate integrated circuits or separate devices interconnected with each other in a suitable manner. For example, the memory device 70 may be the system memory separate from the controller unit 60 or may be integrated within the controller unit 60.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. An advanced communication controller unit comprising:
 a protocol event recording circuit comprising:
  a monitoring input connected to at least one internal protocol event data transmission path of said advanced communication controller unit, wherein the protocol event recording circuit is configured to communicate with a protocol engine and a host interface of the advanced communication controller via the at least one internal protocol event data transmission path, wherein the monitoring input is to monitor status information of registers of the host interface; and
  a debug output connected to a memory device, wherein the advanced communication controller unit is coupled to a communication medium and is adapted to communicate with another communication controller over the communication medium using a communication protocol, is to filter protocol event data, received from said monitoring input via the at least one internal protocol event data transmission path, depending on at least one configuration parameter, and is to provide filtered protocol event data to said debug output.

2. The advanced communication controller unit as claimed in claim 1 wherein said communication protocol is a real time communication protocol.

3. The advanced communication controller unit as claimed in claim 1 wherein said communication protocol is a time-triggered communication protocol.

4. The advanced communication controller unit as claimed in claim 1 wherein said communication protocol comprises the FlexRay (trademark) protocol.

5. The advanced communication controller unit as claimed in claim 1 wherein said protocol event recording circuit is adapted to non-intrusively record said filtered protocol event data.

6. The advanced communication controller unit as claimed in claim 1 wherein said protocol event recording circuit is adapted to record said protocol event data during a startup phase of a distributed communication system comprising the advanced communication controller unit and one or more other communication controller units.

7. The advanced communication controller unit as claimed in claim 1 wherein said memory device is a first in, first out buffer device.

8. The advanced communication controller unit as claimed in claim 1 wherein said memory device is a generic buffering sub-system.

9. The advanced communication controller unit as claimed in claim 1 further comprising:

a configuration user interface adapted to provide said at least one configuration parameter to said protocol event recording circuit.

10. The advanced communication controller unit as claimed in claim 1 wherein said memory device is adapted to buffer an amount of said filtered protocol event data depending on a configurable buffer size parameter.

11. The advanced communication controller unit as claimed in claim 1 wherein said protocol event recording circuit is adapted to provide said filtered protocol event data to said memory device in a protocol event frame format.

12. A vehicle, comprising at least one advanced communication controller unit as claimed in claim 1.

13. A method comprising:
communicating between an advanced communication controller unit and another communication controller unit over a communication medium, wherein a distributed communication system comprises a plurality of communication controller units, at least one being the advanced communication controller unit, wherein each communication controller unit is coupled to the communication medium, and each communication controller unit is adapted to communicate using a communication protocol;
receiving protocol event data transmitted on at least one internal protocol event data transmission path of the advanced communication controller unit via a monitoring input of the protocol event recording circuit, the at least one internal protocol event data transmission path connected between a protocol engine and a host interface of the advanced communication controller, wherein the monitoring input is to monitor status information of registers of the host interface;
filtering said protocol event data, received via the at least one internal protocol event data transmission path, depending on at least one configuration parameter; and
providing filtered protocol event data to a memory device.

14. The method as claimed in claim 13, comprising
providing said at least one configuration parameter to said protocol event recording circuit using a configuration user interface.

15. The method as claimed in claim 13, comprising
processing said filtered protocol event data using a debugging unit.

16. The method as claimed in claim 13 further comprising:
non-intrusively recording said filtered protocol event data.

17. The method as claimed in claim 13 further comprising:
recording said protocol event data during a startup phase of said distributed communication system.

18. The method as claimed in claim 13 further comprising:
buffering, by the memory device, an amount of said filtered protocol event data depending on a configurable buffer size parameter.

19. A method comprising:
communicating between an advanced communication controller unit and another communication controller unit over a communication medium, wherein a distributed communication system comprises a plurality of communication controller units, at least one being the advanced communication controller unit, wherein each communication controller unit is coupled to the communication medium, and each communication controller unit is adapted to communicate using a communication protocol;
receiving protocol event data transmitted on at least one internal protocol event data transmission path of the advanced communication controller unit via a monitoring input of the protocol event recording circuit, the at least one internal protocol event data transmission path connected between a protocol engine and a host interface of the advanced communication controller, wherein the monitoring input is to monitor status information of registers of the host interface;
filtering said protocol event data, received via the at least one internal protocol event data transmission path, depending on at least one configuration parameter;
providing filtered protocol event data to a memory device;
providing a write pointer to a debugger unit of the advanced communication controller unit in response to the filtered protocol event data being stored in the memory device, wherein the write pointer identifies a location of the filtered protocol event data in the memory device.

20. The method of claim 19 further comprising:
providing additional filtered protocol event data to the memory device; and
incrementing the write pointer in response to the additional filtered protocol event data being stored in the memory device, wherein the incremented write pointer identifies a location of the additional filtered protocol event data in the memory device.

* * * * *